(12) United States Patent
Kwon et al.

(10) Patent No.: US 11,625,610 B2
(45) Date of Patent: Apr. 11, 2023

(54) MULTIPLE-INPUT MULTIPLE-OUTPUT (MIMO) DETECTOR SELECTION USING NEURAL NETWORK

(71) Applicant: Samsung Electronics Co., Ltd., Gyeonggi-do (KR)

(72) Inventors: Hyukjoon Kwon, San Diego, CA (US); Shailesh Chaudhari, San Diego, CA (US); Kee-Bong Song, San Diego, CA (US)

(73) Assignee: Samsung Electronics Co., Ltd

( * ) Notice: Subject to any disclaimer, the term of this patent is extended or adjusted under 35 U.S.C. 154(b) by 548 days.

(21) Appl. No.: 16/738,455

(22) Filed: Jan. 9, 2020

(65) Prior Publication Data

US 2020/0293896 A1   Sep. 17, 2020

Related U.S. Application Data

(63) Continuation-in-part of application No. 16/429,856, filed on Jun. 3, 2019.
(Continued)

(51) Int. Cl.
*G06N 3/08* (2006.01)
*G06N 3/04* (2006.01)
*G06N 3/084* (2023.01)

(52) U.S. Cl.
CPC ............ *G06N 3/084* (2013.01); *G06N 3/04* (2013.01)

(58) Field of Classification Search
CPC ........ G06N 3/084; G06N 3/04; G06N 3/0454; H04L 25/03165; H04L 25/067;
(Continued)

(56) References Cited

U.S. PATENT DOCUMENTS 8,040,959 B2   10/2011   Waters et al.
8,638,887 B1   1/2014    Choi et al.
(Continued)

FOREIGN PATENT DOCUMENTS

CN    111224906 A   *   6/2020   ........... G06N 3/0454
CN    111630787 A   *   9/2020   ........... G06N 3/0454
(Continued)

OTHER PUBLICATIONS

C. Liu, Q. Zhou, X. Wang and K. Chen, "MIMO Signal Multiplexing and Detection Based on Compressive Sensing and Deep Learning," in IEEE Access, vol. 7, pp. 127362-127372, 2019, doi: 10.1109/ACCESS.2019.2937490. (Year: 2019).*
(Continued)

*Primary Examiner* — Charles T Shedrick
(74) *Attorney, Agent, or Firm* — The Farrell Law Firm, P.C.

(57) ABSTRACT

A method and system for training a neural network are herein provided. According to one embodiment, a method includes generating a first labelled dataset corresponding to a first modulation scheme and a second labelled dataset corresponding to a second modulation scheme, determining a first gradient of a cost function between a first neural network layer and a second neural network layer based on back-propagation using the first labelled dataset and the second labelled dataset, and determining a second gradient of the cost function between the second neural network layer and a first set of nodes of a third neural network layer based on back-propagation using the first labelled dataset. The first set of nodes of the third neural network layer correspond to a first plurality of detector classes associated with the first modulation scheme.

20 Claims, 11 Drawing Sheets

Related U.S. Application Data

(60) Provisional application No. 62/910,822, filed on Oct. 4, 2019, provisional application No. 62/817,372, filed on Mar. 12, 2019.

(58) Field of Classification Search
CPC ... H04L 1/0052; H04L 1/0036; H04L 1/0054; H04L 1/20; H04L 25/0242; H04L 25/0256; H04B 7/0413
See application file for complete search history.

(56) References Cited

U.S. PATENT DOCUMENTS

| | | | |
|---|---|---|---|
| 9,674,003 | B2 | 6/2017 | Kant et al. |
| 11,344,696 | B2 * | 5/2022 | Choi ................. A61N 5/0618 |
| 2007/0183541 | A1 * | 8/2007 | Moorti ................ H04L 25/067 375/262 |
| 2010/0027703 | A1 | 2/2010 | Yeh et al. |
| 2020/0153535 | A1 * | 5/2020 | Jayaweera Kankanamge ............ H04B 1/0003 |
| 2020/0293896 | A1 * | 9/2020 | Kwon .................... G06N 3/04 |
| 2021/0021307 | A1 * | 1/2021 | Shattil ................ H04B 7/0691 |
| 2022/0036171 | A1 * | 2/2022 | Ge ........................ G06N 3/084 |
| 2022/0060917 | A1 * | 2/2022 | Vitthaladevuni ............ H04W 36/0005 |

FOREIGN PATENT DOCUMENTS

| | | | | |
|---|---|---|---|---|
| EP | 3648012 | A1 * | 5/2020 | .......... G06K 9/6256 |
| EP | 3761237 | A1 * | 1/2021 | ............ G06N 20/10 |
| EP | 3761238 | A1 * | 1/2021 | ............ G06N 20/00 |
| WO | WO-2021101315 | A1 * | 5/2021 | .......... G06K 9/6256 |
| WO | WO-2021181002 | A1 * | 9/2021 | |
| WO | WO-2022025316 | A1 * | 2/2022 | |
| WO | WO-2022045377 | A1 * | 3/2022 | |

OTHER PUBLICATIONS

Y. Liao, H. Yao, Y. Hua and C. Li, "CSI Feedback Based on Deep Learning for Massive MIMO Systems," in IEEE Access, vol. 7, pp. 86810-86820, 2019, doi: 10.1109/ACCESS.2019.2924673. (Year: 2019).*

Z. Liu, M. del Rosario and Z. Ding, "A Markovian Model-Driven Deep Learning Framework for Massive MIMO CSI Feedback," in IEEE Transactions on Wireless Communications, vol. 21, No. 2, pp. 1214-1228, Feb. 2022, doi: 10.1109/TWC.2021.3103120. (Year : 2022).*

Naeem M, De Pietro G, Coronato A. Application of Reinforcement Learning and Deep Learning in Multiple-Input and Multiple-Output (MIMO) Systems. Sensors. 2022; 22(1):309. https://doi.org/10.3390/s22010309 (Year: 2022).*

Zhong S, Feng H, Zhang P, Xu J, Luo H, Zhang J, Yuan T, Huang L. Deep Learning Based Antenna Selection for MIMO SDR System. Sensors. 2020; 20(23):6987. https://doi.org/10.3390/s20236987 (Year: 2020).*

M. -S. Baek, S. Kwak, J. -Y. Jung, H. M. Kim and D. -J. Choi, "Implementation Methodologies of Deep Learning-Based Signal Detection for Conventional MIMO Transmitters," in IEEE Transactions on Broadcasting, vol. 65, No. 3, pp. 636-642, Sep. 2019, doi: 10.1109/TBC.2019.2891051 (Year: 2019).*

R. Taniguchi and K. Nishimori, "Modulation scheme estimation using convolutional neural network for multi-beam Massive MIMO," 2019 International Symposium on Antennas and Propagation (ISAP), 2019, pp. 1-2 (Year: 2019).*

S. Chaudhari, H. Kwon and K. -B. Song, "MIMO Detector Selection for Multiple High-Order Modulations with Unified Neural Network ," GLOBECOM 2020-2020 IEEE Global Communications Conference, 2020, pp. 1-6, doi: 10.1109/GLOBECOM42002.2020.9348081 (Year: 2020).*

Z. Zhou, S. Jere, L. Zheng and L. Liu, "Learning with Knowledge of Structure: A Neural Network-Based Approach for MIMO-OFDM Detection," 2020 54th Asilomar Conference on Signals, Systems, and Computers, 2020, pp. 22-26, doi: 10.1109/IEEECONF51394.2020.9443477 (Year: 2020).*

Bertrand M. Hochwald et al., "Achieving Near-Capacity on a Multiple-Antenna Channel", Aug. 6, 2001, 28 pages.

Jungwon Lee et al., "MIMO Maximum Likelihood Soft Demodulation Based on Dimension Reduction", Globecom 2010, Dec. 8, 2010, 18 pages.

Mojtaba Rahmati et al., "Low Complexity Soft Detection of High Order QAM with Prior Information", IEEE Xplore, 2015, 5 pages.

Shailesh Chaudhari et al., "Reliable and Low-Complexity MIMO Detector Selection using Neural Network", Oct. 11, 2019, 8 pages.

3GPP, 3rd Genertion Partnership Project; Technical Specification Group Radio Access Network; NR; Physical Channels and Modulation (Release 15), 3GPP TS 38.211 V15.2.0, Jun. 2018, 91 pages.

Juquan Mao et al., "A Low Complexity 256QAM Soft demapper for 5G Mobile System", Conference Paper, ResearchGate, Jun. 2016, 6 pages.

3GPP, 3rd Generation Partnership Project; Technical Specification Group Radio Access Network; NR; Physical Layer Procedures for Data (Relase 15), 3GPP TS 38.214 V15.2.0, Jun. 2018, 95 pages.

Roberto Battiti, "Using Mutual Information for Selecting Features in Supervised Neural Net Learning", IEEE Transactions on Neural Networks, Jul. 1994, 14 pages.

* cited by examiner

MULTIPLE-INPUT MULTIPLE-OUTPUT (MIMO) DETECTOR SELECTION USING NEURAL NETWORK

PRIORITY

This application is a Continuation-in-Part Application of, and claims priority to, U.S. patent application Ser. No. 16/429,856, which was filed on Jun. 3, 2019 and claimed priority under 35 U.S.C. § 119(e) to a U.S. Provisional Patent Application filed on Mar. 12, 2019 in the United States Patent and Trademark Office and assigned Ser. No. 62/817,372, and to a U.S. Provisional Patent Application filed on Oct. 4, 2019 and assigned Ser. No. 62/910,822, the entire contents of each of which are incorporated herein by reference.

FIELD

The present disclosure is generally related to wireless communication systems. In particular, the present disclosure is related to multiple-input multiple-output detector selection using a neural network.

BACKGROUND

In a wireless communication system (e.g., long term evolution (LTE), $5^{th}$ generation new radio (5G NR)), a multiple-input multiple-output (MIMO) symbol detector computes log-likelihood-ratios (LLRs) of the coded bits in MIMO layers. The LLRs may be determined using various types of detection methods. The complexities of such detection methods range from very high complexity (e.g., maximum likelihood (ML)) to low complexity (e.g., minimum mean square error (MMSE)). Typically, the performance of the detection method, measured in terms of an error rate, is inversely proportional to the complexity. Therefore, an ML has minimum error rate while an MMSE has maximum error rate.

Typically, one detector is used to obtain LLRs for all resource elements (REs) irrespective of channel conditions in the REs. When choosing to use such a static detector, there is a trade-off between complexity and error rate. If low error rate is desired, then a high complexity detector is used. On the other hand, if a low complexity detector is used, then the error rate increases.

SUMMARY

According to one embodiment, a method includes generating a first labelled dataset corresponding to a first modulation scheme and a second labelled dataset corresponding to a second modulation scheme, determining a first gradient of a cost function between a first neural network layer and a second neural network layer based on back-propagation using the first labelled dataset and the second labelled dataset, and determining a second gradient of the cost function between the second neural network layer and a first set of nodes of a third neural network layer based on back-propagation using the first labelled dataset. The first set of nodes of the third neural network layer correspond to a first plurality of detector classes associated with the first modulation scheme.

According to one embodiment, a system includes a memory and a processor configured to generate a first labelled dataset corresponding to a first modulation scheme and a second labelled dataset corresponding to a second modulation scheme, determine a first gradient of a cost function between a first neural network layer and a second neural network layer based on back-propagation using the first labelled dataset and the second labelled dataset, and determine a second gradient of the cost function between the second neural network layer and a first set of nodes of a third neural network layer based on back-propagation using the first labelled dataset. The first set of nodes of the third neural network layer correspond to a first plurality of detector classes associated with the first modulation scheme.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
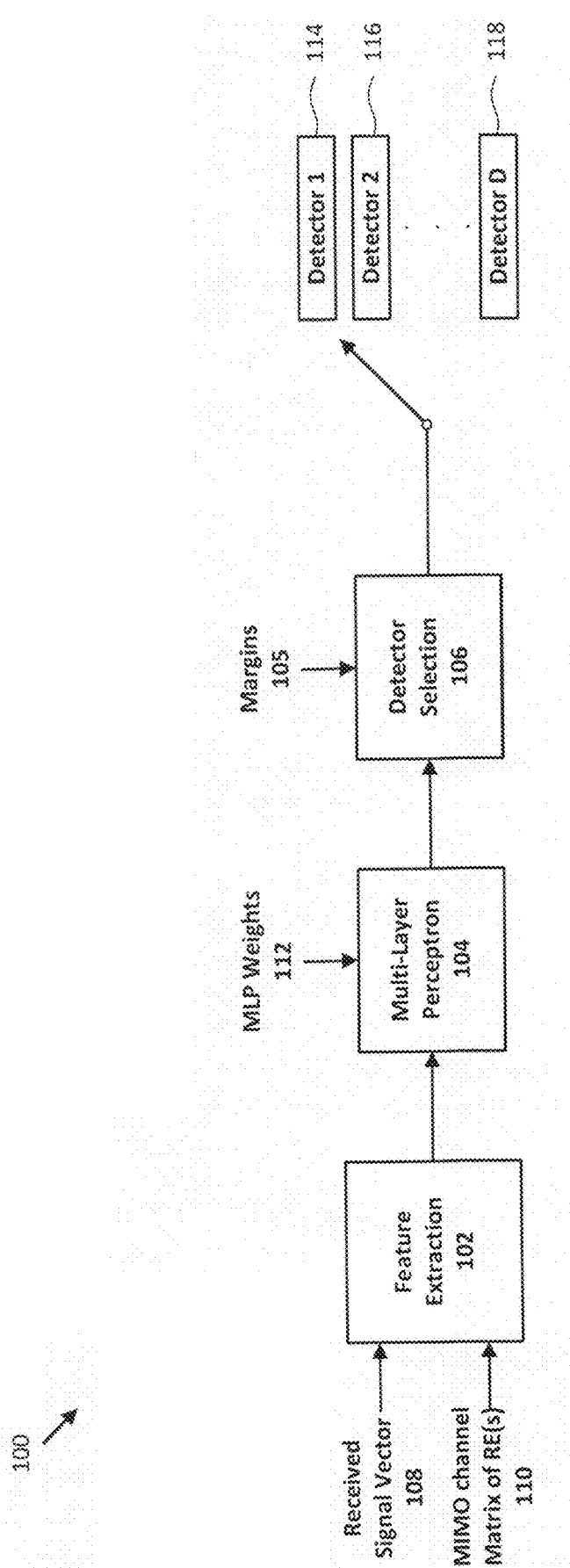
FIG. 1 illustrates a diagram of a system for MIMO detector selection, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1st," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

The present disclosure provides a system and method for selection of a multiple-input multiple-output (MIMO) detector to detect symbols in a resource element (RE). The system and method selects the detector based on instantaneous channel conditions in the RE using a neural network, such as a multi-layer perceptron (MLP). An MLP is a type of neural network widely used in machine learning for classification and parameter estimation. The system and method use an MLP to dynamically select a reliable low-complexity detector depending on the channel condition in each RE. The system and method allow the modem to simultaneously keep the detector complexity low and achieve error rate of maximum likelihood (ML) by dynamically selecting a reliable low-complexity detector to generate log-likelihood ratios (LLRs).

FIG. 1 illustrates a diagram of a system 100 for MIMO detector selection, according to an embodiment. The system 100 includes a feature extraction block 102, an MLP network 104, a detector selection block 106, and a plurality of detectors (e.g., detector 1 114, detector 2 116 . . . detector D 118). A received signal vector 108 and the MIMO channel matrix of RE(s) 110 are sent to the feature extraction block 102. MLP weights 112 are applied in the MLP network 104.

The features are provided as input to the MLP network 104. The features selected may represent the channel, received signal, noise variance, and other features. Other features include eigenvalues of the channel, diagonal values of the channel matrix, and an inner product of received signals and channel. The system 100 applies the MLP network 104 as a classifier to classify each RE into different classes based on its channel features, where each class corresponds to a detector. For each RE, the MLP network 104 provides D outputs, where D is the number of detector classes or candidate detectors. The dth output of the MLP network 104 indicates whether or not the detector d is the lowest-complexity detector that can provide performance similar to the ML detector. Inaccurate prediction by the MLP network 104 can increase the error rate. Therefore, the outputs of the MLP network 104 are further processed in the detector selection block 106 that selects a highly reliable, low-complexity detector that matches an error rate of the ML. The parameters of the MLP network 104 (i.e., MLP weights 112) and the parameters (i.e., the margins 105) of the detector selection block 106 are tuned offline using the labelled dataset having channel features and corresponding labels of detector. The labelled dataset is collected under different channel models and signal-to-noise ratios (SNRs).

Figure 2:
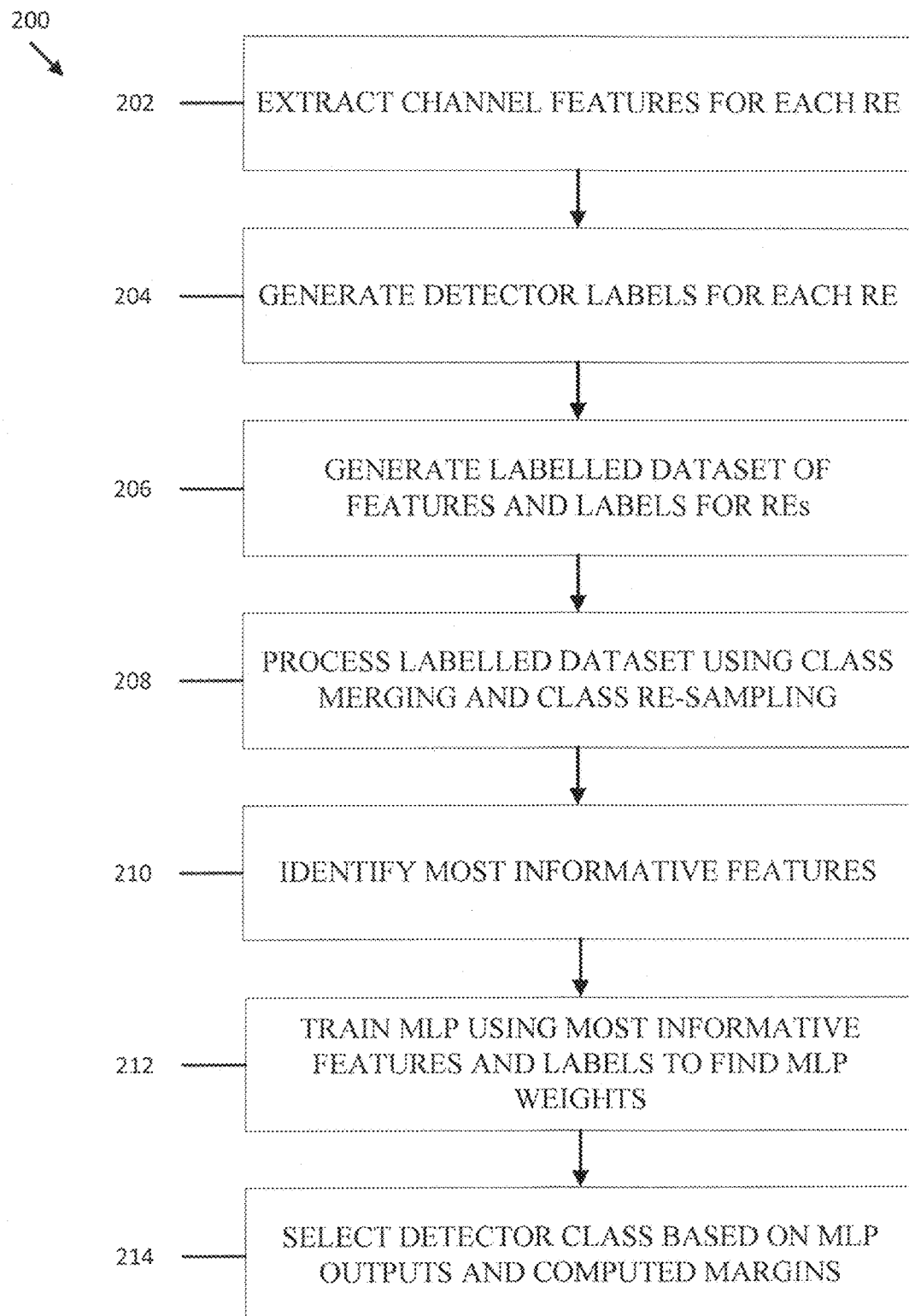
FIG. 2 illustrates a flowchart of an offline tuning method to compute MLP weights and margins, according to an embodiment.

FIG. 2 illustrates a flowchart 200 of offline tuning method to compute MLP weights 112 and margins 105, according to an embodiment. At 202, the system extracts channel features. The instantaneous channel features are extracted from the MIMO channel matrix 110 in the RE. Features can also be extracted from MIMO channel matrices of a group of REs. The MIMO channel matrix 110 is indicated by H and received signal vector 108 is indicated by y, which may be expressed as in Equation (1).

$$y = Hx + n \qquad (1)$$

In Equation (1), x is the vector containing the transmitted symbols and n is the noise vector. It may be assumed that the noise is whitened. The dimensions of matrices y, H, x, and n are R×1, R×T, T×1, and R×1, respectively, where R is the number of receiver antennas and T is the number of transmitted symbols.

The channel features may include, but not limited to, the following:

Feature-1 ($f_1$): Total channel power: $\Sigma_{ij}|h_{ij}|^2$, where $h_{ij}$ is the element at the ith row and jth column in matrix H;

Feature-2 ($f_2$): Ratio of diagonal-to-off-diagonal channel power;

Feature-3 ($f_3$): Ratio of the largest and the smallest eigenvalues of H*H, where H* is the complex conjugate of H;

Feature-4 ($f_4$): Real and imaginary parts of elements of the channel matrix;

Feature-5 ($f_5$): Magnitude-square of elements of channel matrix: $|h_{ij}|^2$;

Feature-6 ($f_6$): Real and imaginary parts of elements of R where R is an upper or lower triangular matrix such that H=QR, where Q is an unitary matrix satisfying QQ*=I=Q*Q;

Feature-7 ($f_7$): Magnitude-square of elements of R matrix: $|r_{ij}|^2$, where $r_{ij}$ is the element at the ith row and jth column in matrix R; and Feature-8 ($f_8$): y-h product: $y*h_i$ where $h_i$ is the ith column of matrix H.

At 204 the system generates labels z for each RE. The detector label may be any integer from 1 to D. It may be assumed that the detector label is arranged in the ascending order of complexity where 1 indicates the lowest complexity detector and D indicates the highest complexity ML detector, although other orders of detectors may be utilized. $x_t$ indicates the transmitted symbols in the RE in MIMO layer-t. The symbol $x_t$ is represented by M transmitted bits as in Equation (2).

$$\{b_{t1}, b_{t2}, \ldots, b_{tM}\} \quad (2)$$

The transmitted symbol vector is x, as in Equation (3).

$$x = \begin{bmatrix} x_1 \\ x_2 \\ \vdots \\ x_T \end{bmatrix} \quad (3)$$

Using y and H, the system computes the LLR $L_{tm}^{(d)}$, for the mth bit in MIMO layer-t if detector d is used. The LLR $L_{tm}^{(d)}$ is the logarithm of the ratio of the probability that transmitted bit $b_{tm}$ is 1 to the probability that transmitted bit $b_{tm}$ is 0. For each candidate detector $d \in \{1, 2, \ldots, D\}$, the system obtains corresponding LLRs for M bits in each layer. The LLRs are used to generate a label indicating the lowest-complexity detector that can reliably achieve the same error rate as the ML. The system generates the label z using the LLR sign or using the LLR sign and magnitude.

When using the LLR sign to generate labels, the detector LLRs are converted to bits as in Equation (4).

$$b_{tm}^{(d)}=1, \text{ if } L_{tm}^{(d)}>0;$$

$$b_{tm}^{(d)}=0, \text{ otherwise} \quad (4)$$

The label z is the smallest detector class d for which $b_{tm}=b_{tm}^{(d)}, t \in \{1, 2, \ldots, T\}, m=\{1, 2, \ldots, M\}\}$. Therefore, under this method, z is the lowest-complexity detector whose LLRs' sign matches true bits.

When generating labels using the LLR sign and magnitude, the system uses both a sign and a magnitude of a LLR to determine the detector label. LLR values are used to compute the probability, $p_t^{(d)}$, that the transmitted symbol $x_t$ in MIMO layer-t was equal to the symbol $x_t^{(d)}$ that represented by bits $\{b_{t1}^{(d)}, b_{t2}^{(d)}, \ldots, b_{tM}^{(d)}\}$. This label generation method uses the same bits $b_{tm}^{(d)}$ computed in the method using only the LLR sign described above. The label z under this method is the smallest detector class d for which $p_t^{(d)} > \zeta, t=\{1, 2, \ldots, T\}$ for threshold $\zeta$.

At 206, the system generates a labelled dataset of features and labels for the REs. The labelled dataset includes tuples $\{f, z\}$ under different channel models and SNRs. The labelled dataset includes N tuples and each tuple contains channel features $f_1, f_2, \ldots, f_8$ and labels z.

At 208, the system processes the labelled datasets using class-merging and class-resampling. Class merging may be performed prior to training the MLP to manipulate the labelled data set to train the MLP such that it can accurately predict which REs require higher complexity detectors. For example, if there are D=4 detector classes, detector 4 is required for some REs depending on the channel conditions in order to achieve a corresponding error rate. Therefore, the MLP should have high training accuracy for detector class 4.

Figure 3:
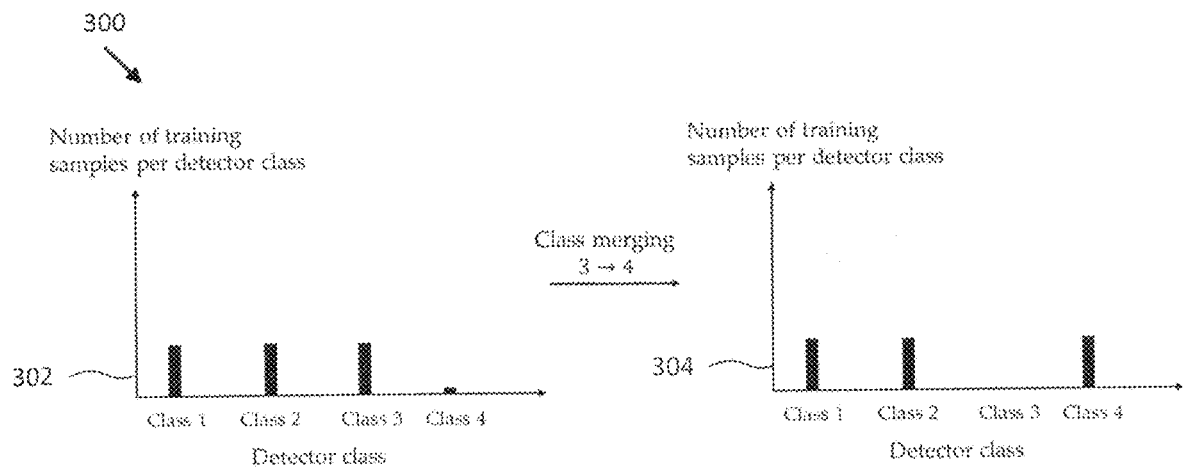
FIG. 3 illustrates a diagram of class merging, according to an embodiment.

FIG. 3 illustrates a diagram 300 of class merging, according to an embodiment. The training accuracy depends on the number of samples per class. As shown in graph 302, if class 4 has fewer training samples, then the MLP cannot achieve high training accuracy for class 4 which results in higher detection error. In order to achieve higher training accuracy for class 4, the system may merge class 3 into 4 by changing the label 3 to 4 as shown in graph 304. This is valid since the detectors are arranged in ascending order of complexity. Therefore, if the symbol can be detected accurately by detector 3, then it can also be detected accurately by detector 4.

Additionally, the system may re-sample the classes. Class re-sampling ensures that a training dataset does not contain an overwhelming number of samples with one detector class. Considering that the training dataset includes $N_d$ samples for detector d, such that $\Sigma_{d=1}^{D} N_d = N$, the cost function $c(w_{ij}^{(l)}, \beta_i^{(l)})$ depends on N and in turn depends on $N_d$.

Figure 4:
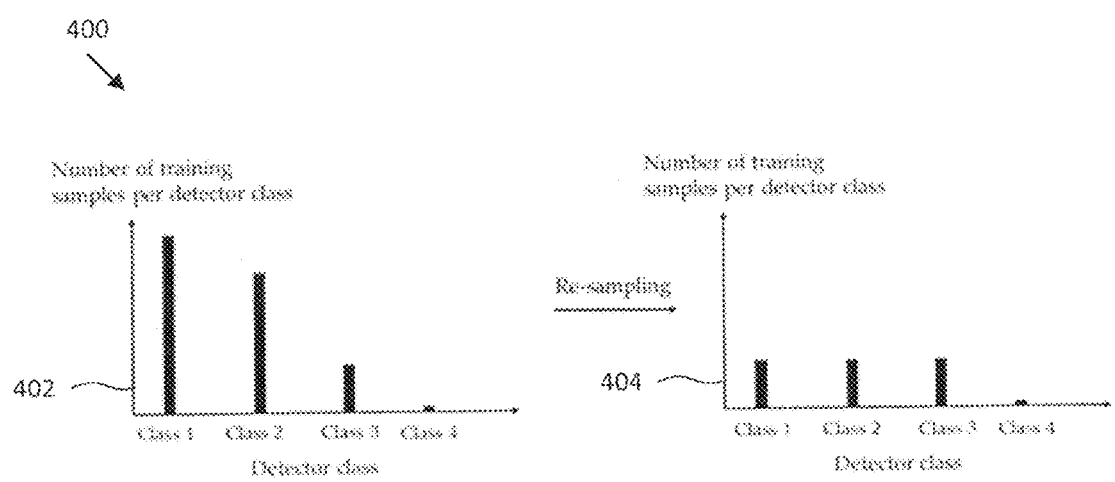
FIG. 4 illustrates a diagram of class re-sampling, according to an embodiment.

FIG. 4 illustrates a diagram 400 of class re-sampling, according to an embodiment. If one particular detector has significantly greater number of labels in the dataset, then the training is biased to that detector. As shown in graph 402, detector class 1 and class 2 include significantly greater number of labels than the other classes. This results in lower training accuracy for detectors which have fewer labels in dataset. To remove this bias, the system removes extra samples to ensure that most classes have equal number of training samples, as shown in graph 404.

At 210, the system identifies the most informative (relevant) features. The system may identify the most informative features regarding label z by using mutual information between label z and features $f_i$.

At 212, the system trains the MLP network using a most informative features and labels to find MLP weights 112.

Figure 5:
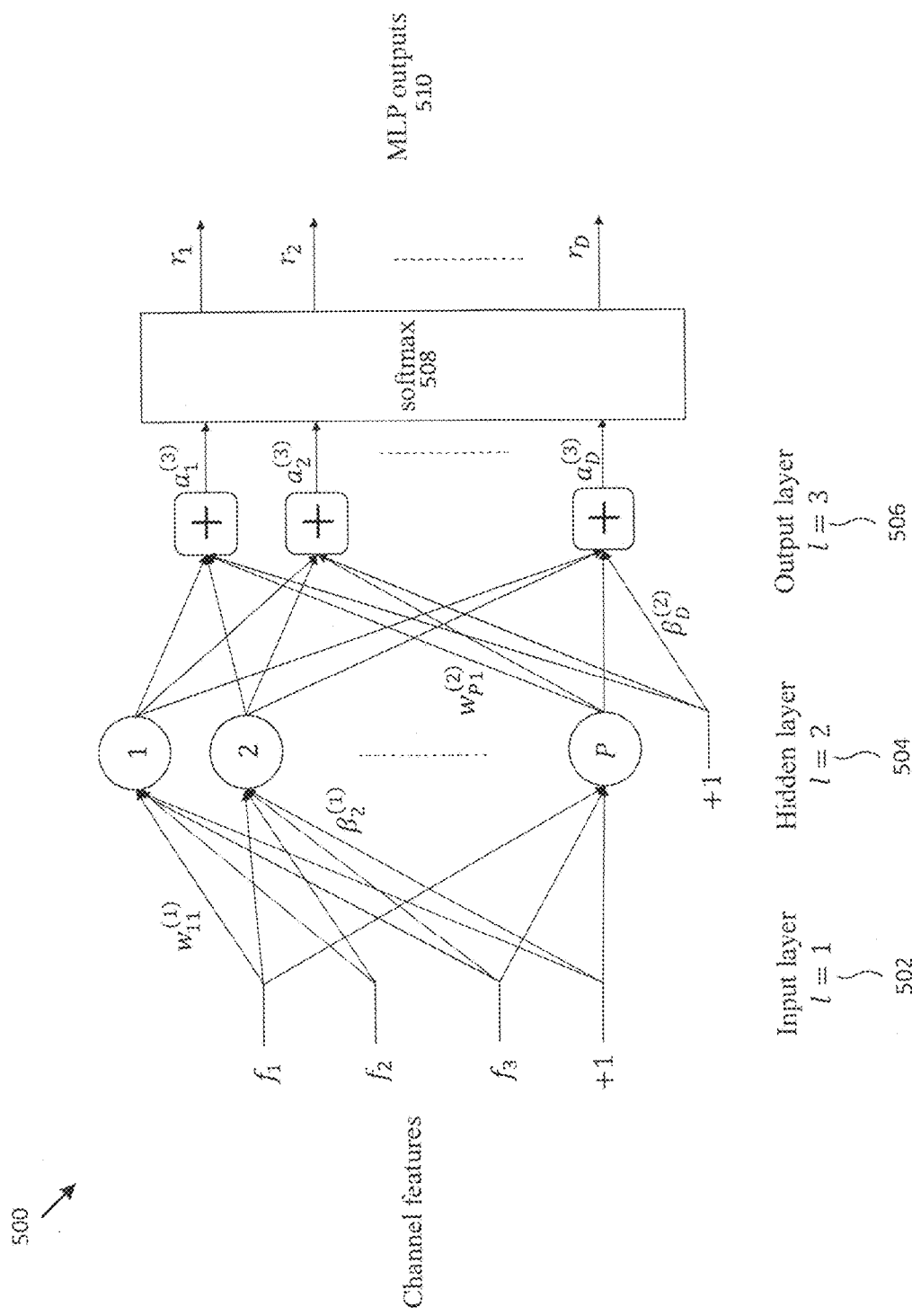
FIG. 5 illustrates a diagram of an MLP network, according to an embodiment.

FIG. 5 illustrates a diagram of an MLP network, according to an embodiment. An MLP network 500 includes an input layer 502, one hidden layer 504, an output layer 506 and P nodes. The hidden nodes use a sigmoid activation function. The outputs 510 of the MLP are computed by applying a softmax function 508 on the output layer 506, which includes of D nodes. $w_{ij}^{(l)}$ indicates the weight between j-th node l-th layer to i-th node in layer (l+1), and the output of the node i in layer l=2 is as Equation (5).

$$a_i^{(2)} = g\left(\sum_j w_{ij}^{(1)} f_j + \beta_i^{(1)}\right), i = 1, 2, \ldots, P, \quad (5)$$

In Equation (5), $$g(x) = \frac{1}{1+e^{-x}}$$

is the sigmoid activation function and $\beta_i^{(1)}$ is the bias term. The output of node i in layer l=3 is as Equation (6).

$$a_i^{(3)} = \sum_j w_{ij}^{(2)} a_j^{(2)} + \beta_i^{(2)}, i = 1, 2, \ldots, D \quad (6)$$

The output of the MLP is computed by applying a softmax on $\{\alpha_1^{(3)}, \alpha_2^{(3)}, \ldots, \alpha_D^{(3)}\}$, as in Equation (7).

$$r_i = \frac{e^{a_i^{(3)}}}{\sum_j e^{a_j^{(3)}}}, i = 1, 2, \ldots, D \quad (7)$$

In order to obtain weight and bias terms $\{w_{ij}^{(l)}, \beta_i^{(l)}\}$, the system trains the MLP network using quasi-Newton method to minimize the cross-entropy cost function in Equation (8).

$$c(w_{ij}^{(l)}, \beta_i^{(l)}) = -\sum_{n=1}^{N}\sum_{d=1}^{D} I(z_n = d)\log(r_{d,n}) \quad (8)$$

In Equation (8), $I(z_n=d)$ is an identity function (1 if $z_n$=d, and 0 otherwise), $z_n$ is the label in the n-th training tuple, and $r_{d,n}$ is the MLP output corresponding to n-th training tuple.

Figure 6:
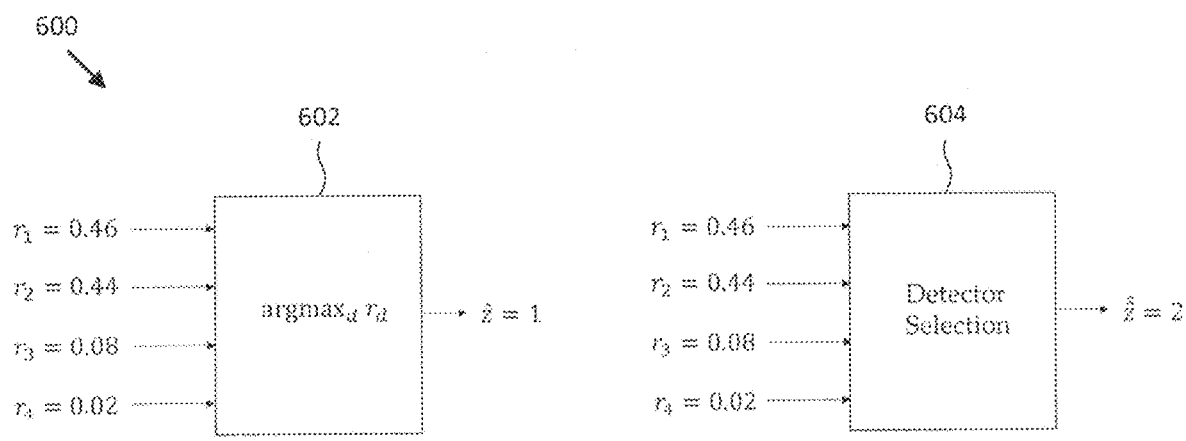
FIGS. 6 and 7 illustrate diagrams of detector selection methods, according to an embodiment.
Figure 7:
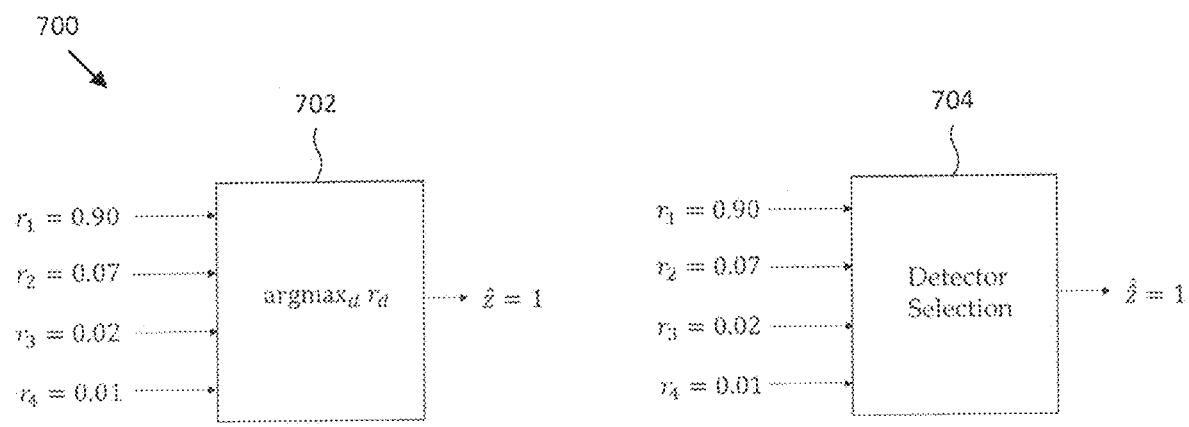

FIGS. 6 and 7 illustrate diagrams of detector selection methods using MLP outputs $r_1, \ldots, r_D$, according to an embodiment. As described below, z is the true class and $\hat{z}$ is the selected class. In diagrams 600 and 700 showing a first selection method 602 and 702 respectively, the class is selected by checking which class has the maximum $r_d$ output value, as in Equation (9).

$$\hat{z} = \mathrm{argmax}_d r_d \quad (9)$$

In the selection method of 602 and 702, the underestimation error may be high. Under-estimation error occurs when the MLP estimates a lower complexity detector when a higher complexity detector is required (i.e., $\hat{z}$<z). In the diagrams 600 and 700 showing a second selection method 604 and 704 respectively, the system selects the detector class by keeping the probability of underestimation error below a threshold $\epsilon$ using Margins 105.

At 214, the system selects a detector class based on MLP outputs and computed margins. To select a reliable detector class, a selection margin $\gamma_d$ is provided for $r_d$ such that the MLP selects detector d only when $r_d$ is maximum among all MLP outputs and $r_d$-$r_{d+1}$>$\gamma_d$. For example, in FIG. 6, D=4, $\gamma_1$=0.5, and the MLP outputs are $r_1$=0.46, $r_2$=0.44, $r_3$=0.08, and $r_4$=0.02. Since the difference between $r_1$ and $r_2$ is small, detector 1 is not reliable. In this scenario, the second selection method 604 selects detector 2, while the first selection method 602 selects detector 1. Detector 2 is more reliable than detector 1 in this case. Further, in FIG. 7, the MLP outputs are $r_1$=0.90, $r_2$=0.07, $r_3$=0.02, and $r_4$=0.01. In this case, detector 1 itself is reliable since the difference between $r_1$ and $r_2$ is large and the second selection method 704 selects detector 1.

The margins $\gamma_d$, d=1, 2, . . . , D are designed to keep the probability of underestimation error below a threshold $\epsilon$. For a given margin $\gamma_d$, the error occurs when $r_d$-$r_{d+1}$>$\gamma_d$ while the true class is z=d+1 and the probability of error is as Equation (10).

$$Pr(r_d - r_{d+1} > \gamma_d; z = d+1) \quad (10)$$

If the margin $\gamma_d$ is too high (e.g., $\gamma_d$=1), then the second selection method always selects class d+1 even though true class is d. This results in utilization of a high complexity detector even when it is not required. To avoid this, the conditional probability $Pr(r_d-r_{d+1}>\gamma_d|z=d)$ is maximized. Thus, the margins $\gamma_1, \gamma_2, \ldots, \gamma_{D-1}$ are determined by solving the optimization problem using an error threshold value $\epsilon$ in Equation (11) for d=1, 2, . . . , D-1.

$$\max_{\gamma_d} Pr(r_d - r_{d+1} > \gamma_d \mid z = d) \quad (11)$$
$$\text{subject to } Pr(r_d - r_{d+1} > \gamma_d; z = d+1) \le \epsilon$$

The margins may be used to obtain selection of the class by following the pseudo code in Table 1.

TABLE 1

Initialize $\hat{z} = D$ and $z_0 = \mathrm{argmax}_{d\in\{1,2,\ldots,D\}} r_d$

IF $z_0$ < D
  FOR d = $z_0$, $z_0$ + 1, . . . , D − 1
    IF $r_d - r_{d+1}$ > $\gamma_d$
      $\hat{z}$ = d
      BREAK
    ENDIF
  ENDFOR
ENDIF The present system and method may be used to select the detector under different SNRs, modulation and coding scheme (MCS) and channel models. A combined labelled dataset is obtained covering these scenarios and the MLP is trained to select the detector. The system and method can also be extended to select detectors for different modulation types such as 64-quadrature amplitude modulation (QAM), 256-QAM, and 1024-QAM.

For example, for detector selection for two modulations $M_1$=64-QAM and $M_2$=256-QAM, $D_1$ and $D_2$ are the number of candidate detector classes for 64-QAM and 256-QAM, respectively. A combined dataset is generated which included labelled data from REs using 64-QAM symbols and 256-QAM symbols. In this dataset, the detector labels for 64-QAM are in the range 1, 2, . . . , $D_1$, while labels for 256-QAM are in the range $D_1$+1, $D_1$+2, . . . , $D+D_2$. The MLP is trained with the combined dataset and the selection margins $\gamma_1, \gamma_2, \ldots, \gamma_{D_1+D_2-1}$ are computed.

In order to select the detector for RE with transmitted symbols from $M_1$, the MLP outputs $r_1, r_2, \ldots, r_{D_1}$ are used along with margins $\gamma_1, \gamma_2, \ldots, \gamma_{D_1}$ as shown in the pseudo code in Table 2.

TABLE 2

Initialize $\hat{z} = D_1$ and $z_0 = \underset{d \in \{1,2,\ldots,D_1\}}{\mathrm{argmax}}\ r_d$
IF $z_0 < D_1$
    FOR $d = z_0, z_0 + 1, \ldots, D_1 - 1$
        IF $r_d - r_{d+1} > \gamma_d$
            $\hat{z} = d$
            BREAK
        ENDIF
    ENDFOR
ENDIF To select the detector for REs with transmitted symbols from $M_2$, the MLP outputs $r_{D_1+1}, r_{D_1+2}, \ldots, r_{D_1+D_2}$ are used along with margins $\gamma_{D_1+1}, \gamma_{D_1+2}, \ldots, \gamma_{D_1+D_2-1}$ as shown in the pseudo code in Table 3.

TABLE 3

Figure 8:
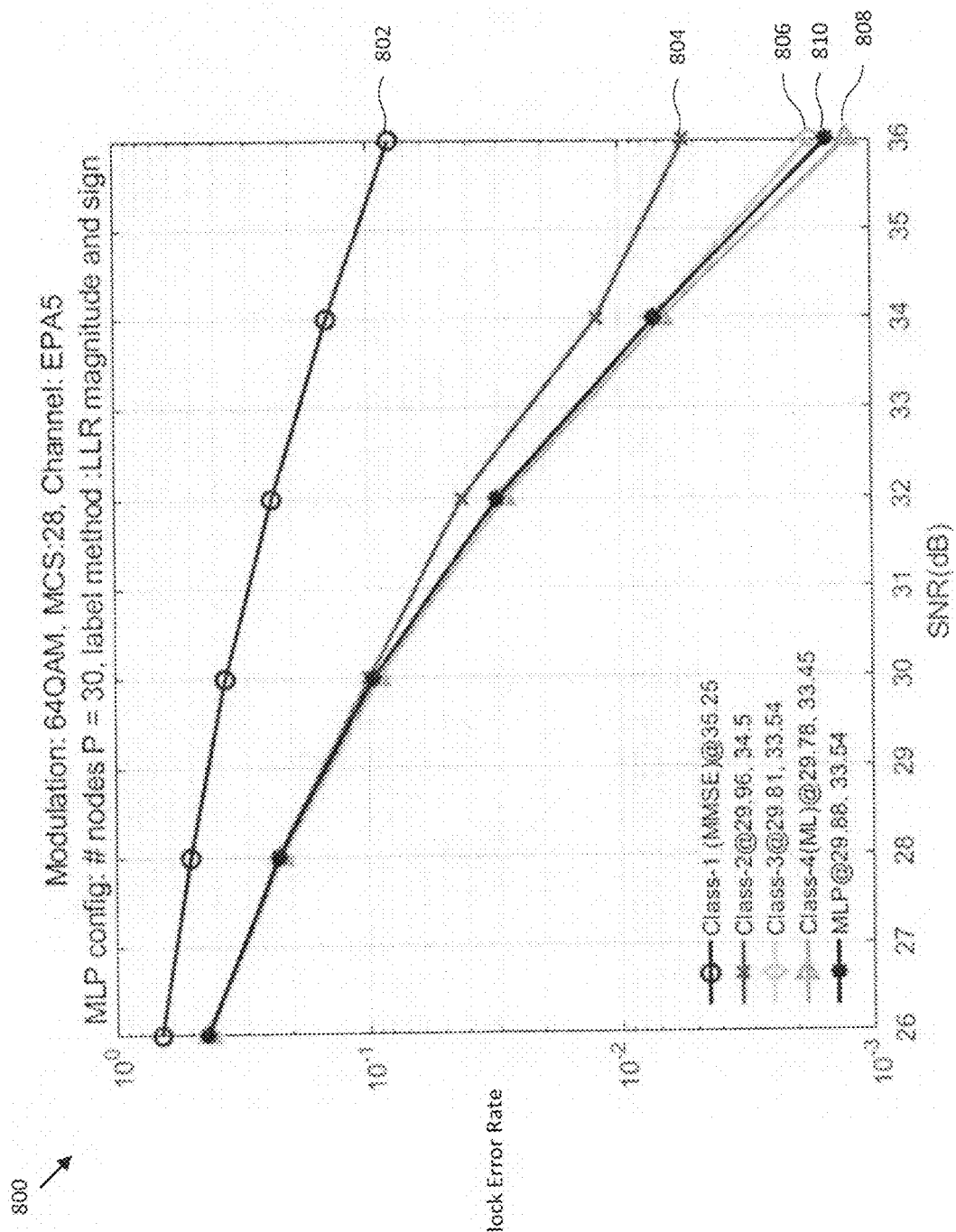
FIG. 8 illustrates a graph of online detector selection results, according to an embodiment.

Initialize $\hat{z} = D_1 + D_2$ and $z_0 = \underset{d \in \{D_1+1,\ldots,D_1+D_2\}}{\mathrm{argmax}}\ r_d$
IF $z_0 < D_1 + D_2$
    FOR $d = z_0, z_0 + 1, \ldots, D_1 + D_2 - 1$
        IF $r_d - r_{d+1} > \gamma_d$
            $\hat{z} = d$
            BREAK
        ENDIF
    ENDFOR
ENDIF FIG. 8 illustrates a graph 800 of online detector selection results, according to an embodiment. FIG. 8 shows the block error rate for static detector selection when detector classes 1 (802), 2 (804), 3 (806), and 4 (808) are used for all REs. Class 4 808 is the ML detector with the highest complexity and lowest error rate, while class 802 is the MMSE detector with the lowest complexity and highest error rate. Graph 800 also shows error rate 810 of the proposed MLP based dynamic detector selection.

Figure 9:
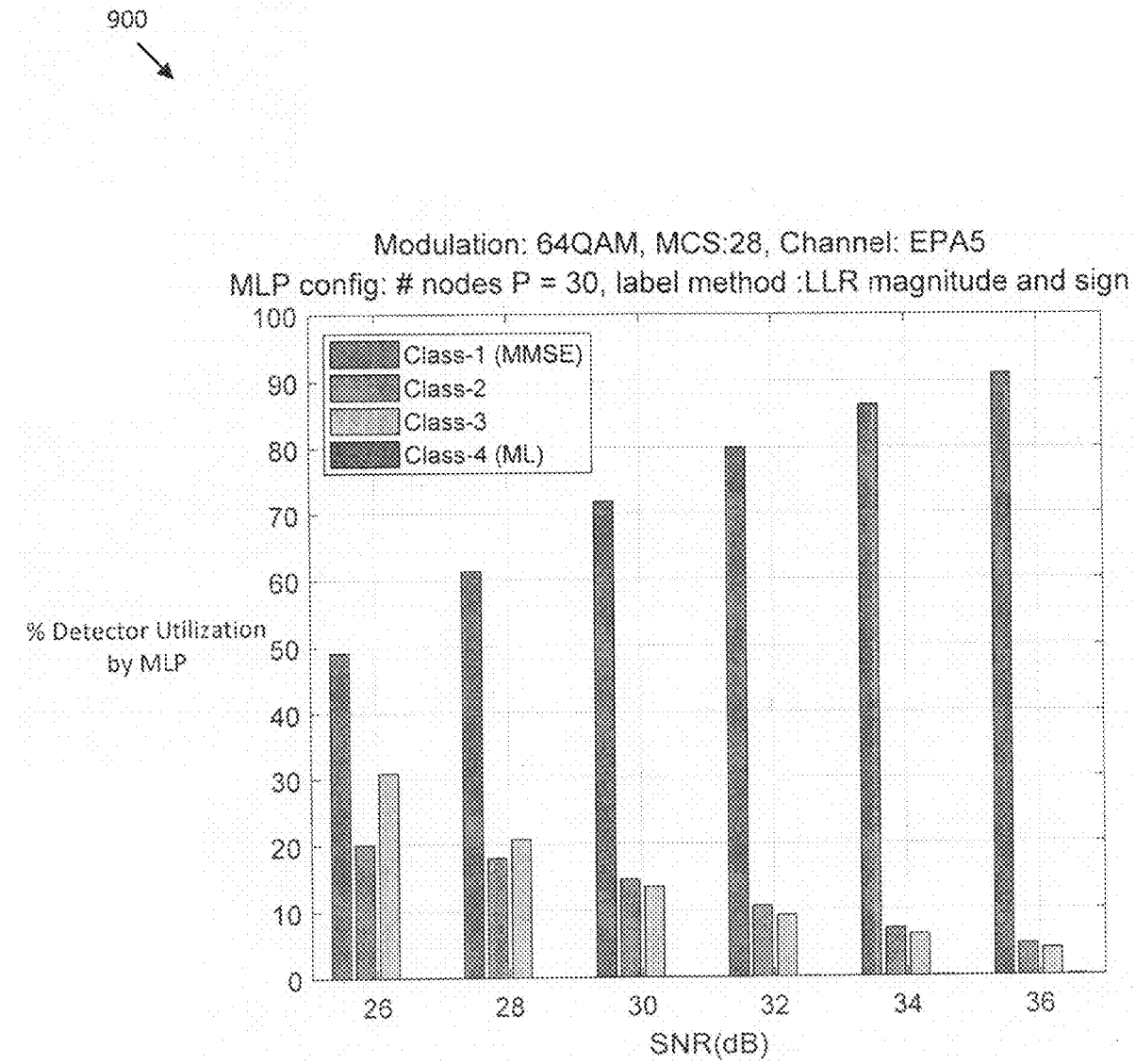
FIG. 9 illustrates a diagram of detector utilization, according to an embodiment.

FIG. 9 illustrates a diagram 900 of detector utilization, according to an embodiment. As shown in diagram 900, the system utilizes low complexity detectors, while providing an error rate similar to that of an ML (class 4) detector.

For example, consider detector selection for three modulations 64-QAM, 256-QAM, and 1024-QAM. Let $D_1$, $D_2$, and $D_3$ be the number of candidate detector classes for 64-QAM, 256-QAM, and 1024-QAM respectively. A combined dataset is generated which included labelled data from REs using 64-QAM, 256-QAM, and 1024-QAM symbols. In this dataset, the detector labels for 64-QAM are in the range $1, 2, \ldots, D_1$, while labels for 256-QAM are in the range $D_1+1, D_1+2, \ldots, D_1+D_2$. Similarly, labels for 1024-QAM are in the range $D_1+D_2+1, D_1+D_2+2, \ldots, D_1+D_2+D_3$. The MLP is trained with the combined dataset and the selection margins $\gamma_1, \gamma_2, \ldots, \gamma_{D_1+D_2+D_3-1}$ are computed.

In order to select the detector for RE with transmitted symbols from 64-QAM, the MLP outputs $r_1, r_2, \ldots, r_{D_1}$ are used along with margins $\gamma_1, \gamma_2, \ldots, \gamma_{D_1}$ as shown in the pseudo code in Table 4.

TABLE 4

Initialize $\hat{z} = D_1$ and $z_0 = \underset{d \in \{1,2,\ldots,D_1\}}{\mathrm{argmax}}\ r_d$
IF $z_0 < D_1$
    FOR $d = z_0, z_0 + 1, \ldots, D_1 - 1$ TABLE 4-continued IF $r_d - r_{d+1} > \gamma_d$
            $\hat{z} = d$
            BREAK
        ENDIF
    ENDFOR
ENDIF To select the detector for REs with transmitted symbols from 256-QAM, the MLP outputs $r_{D_1+1}, r_{D_1+2}, \ldots, r_{D_1+D_2}$ are used along with margins $\gamma_{D_1+1}, \gamma_{D_1+2}, \ldots, \gamma_{D_1+D_2-1}$ as shown in the pseudo code in Table 5. Similarly, to select the detector for REs with transmitted symbols from 1024-QAM, the MLP outputs $r_{D_1+D_2+1}, r_{D_1+D_2+2}, \ldots, r_{D_1+D_2+D_3}$ are used along with margins $\gamma_{D_1+1}, \gamma_{D_1+2}, \ldots, \gamma_{D_1+D_2-1}$ as shown in the pseudo code in Table 6.

TABLE 5

Initialize $\hat{z} = D_1 + D_2$ and $z_0 = \underset{d \in \{D_1+1,\ldots,D_1+D_2\}}{\mathrm{argmax}}\ r_d$
IF $z_0 < D_1 + D_2$
    FOR $d = z_0, z_0 + 1, \ldots, D_1 + D_2 - 1$
        IF $r_d - r_{d+1} > \gamma_d$
            $\hat{z} = d$
            BREAK
        ENDIF
    ENDFOR
ENDIF

TABLE 6

Initialize $\hat{z} = D_1 + D_2 + D_3$ and $z_0 = \underset{d \in \{D_1+D_2+1,\ldots,D_1+D_2+D_3\}}{\mathrm{argmax}}\ r_d$
IF $z_0 < D_1 + D_2 + D_3$
    FOR $d = z_0, z_0 + 1, \ldots, D_1 + D_2 + D_3 - 1$
        IF $r_d - r_{d+1} > \gamma_d$
            $\hat{z} = d$
            BREAK
        ENDIF
    ENDFOR
ENDIF The present disclosure further describes a unified MLP network architecture that includes training to select a MIMO detector from multiple types of modulation schemes e.g., 64-QAM, 256-QAM, and 1024-QAM. When a base station (e.g., a cellular base station) changes a modulation scheme, a user equipment (UE) having the present MLP network architecture may continue to use the same MLP network architecture to select a desired MIMO detector.

Figure 10:
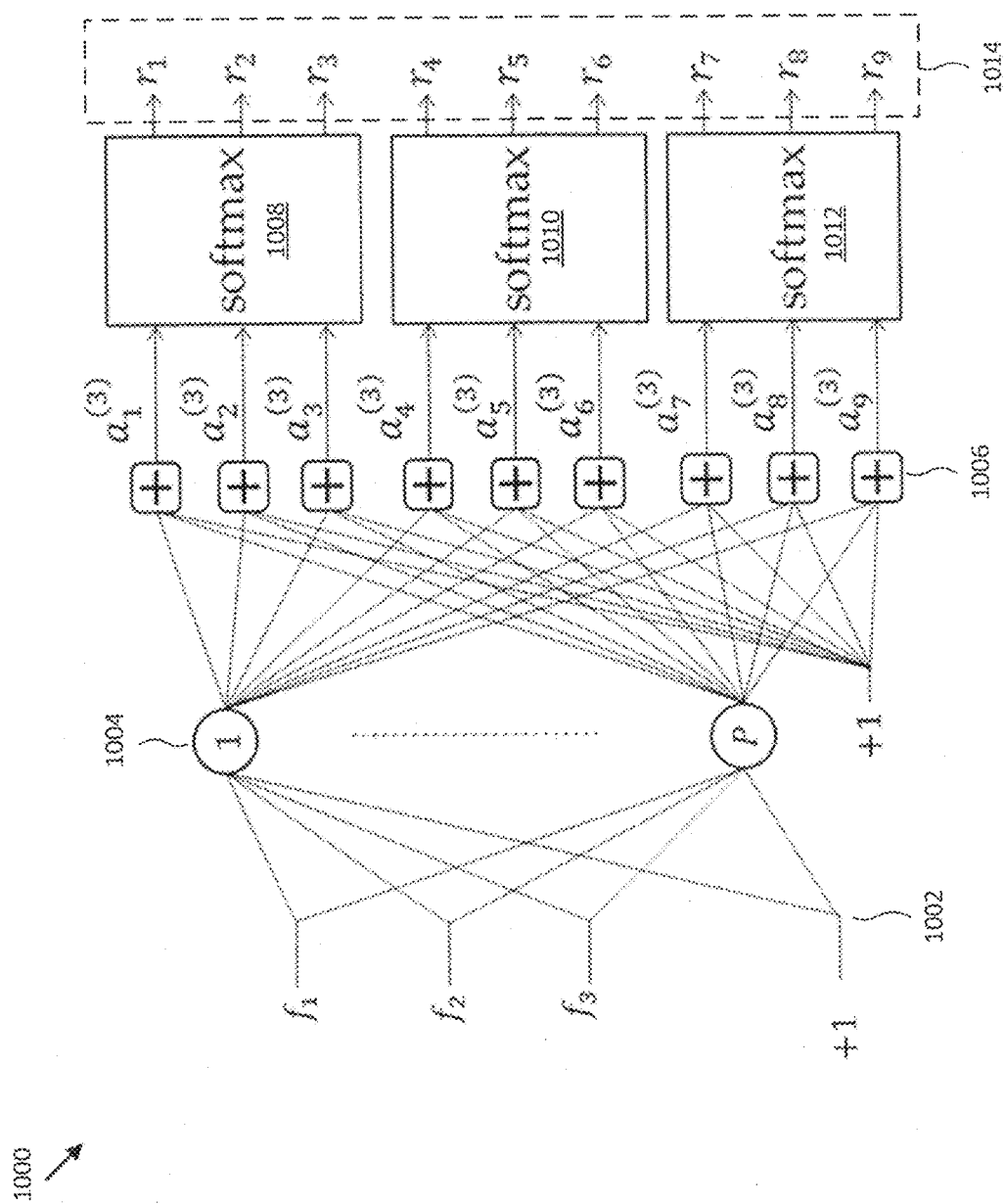
FIG. 10 illustrates another diagram of an MLP network, according to an embodiment.

FIG. 10 illustrates another diagram of an MLP network, according to an embodiment. An MLP network 1000 includes an input layer 1002, one hidden layer 1004, an output layer 1006, and three softmax functions 1008, 1010, and 1012 to produce the MLP outputs 1014. The connections between the input layer 1002 and the hidden layer 1004 are common for all modulation. The connection between hidden layer 1004 and output layer 1006 are modulation specific. In online detector selection, the detector for 64-QAM is selected using outputs $r_1$, $r_2$, $r_3$ as is described above. Similarly, the detector for 256-QAM is selected using outputs $r_4$, $r_5$, $r_6$ and the detector for 1024-QAM is selected using outputs $r_7$, $r_8$, $r_9$.

During MLP training, a back-propagation method may be used to compute the gradient of the cost function with respect to the weights and biases, as in Equation (12).

$$\frac{\delta}{\delta w_{mn}^{(o)}}c(\{w_{ij}^{(l)}, \beta_i^{(l)}\}) \qquad (12)$$

$$\frac{\delta}{\delta \beta_n^{(o)}}c(\{w_{ij}^{(l)}, \beta_i^{(l)}\})$$

The gradients are used to update the weights during offline training using a stochastic gradient descent method or a quasi-Newton method.

However, since the connections between the hidden layer and the output layer are modulation specific, and the softmax block is split, the gradients are computed using selective back propagation. In selective backpropagation, training samples of only a specific type of modulation scheme are used to compute a respective gradient with respect to weights and biases between the hidden layer and the output layer that are connected to a plurality of detector classes associated with the specific type of modulation scheme.

Figure 11:
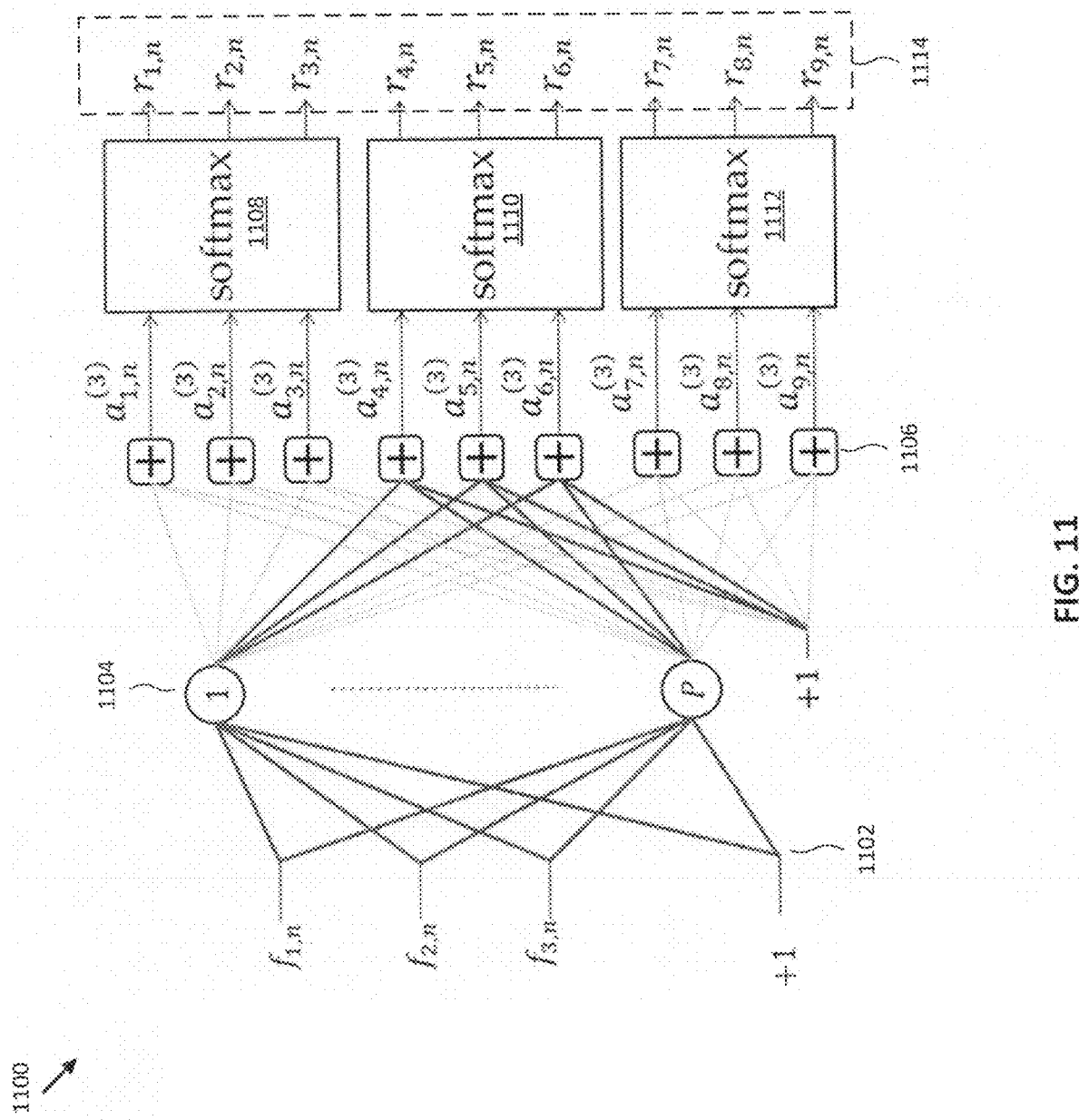
FIG. 11 illustrates another diagram of an MLP network, according to an embodiment.

FIG. 11 illustrates another diagram of an MLP network, according to an embodiment. An MLP network 1100 includes an input layer 1102, one hidden layer 1104, an output layer 1106, and three softmax functions 1108, 1110, and 1112 to produce the MLP outputs 1114. In selective back propagation as shown in FIG. 11, training samples of only 256-QAM are used to compute gradients with respect to weights $w_{4p}^{(2)}, w_{5p}^{(2)}, w_{6p}^{(2)}$, p=1, 2, ..., P and biases $\beta_4^{(2)}, \beta_5^{(2)}, \beta_6^{(2)}$. Therefore, in selective back-propagation, only 256-QAM samples are used to compute gradients with respect to weights and biases between the hidden layer 1104 and the output layer 1106 that are connected to $r_4, r_5, r_6$.

Figure 12:
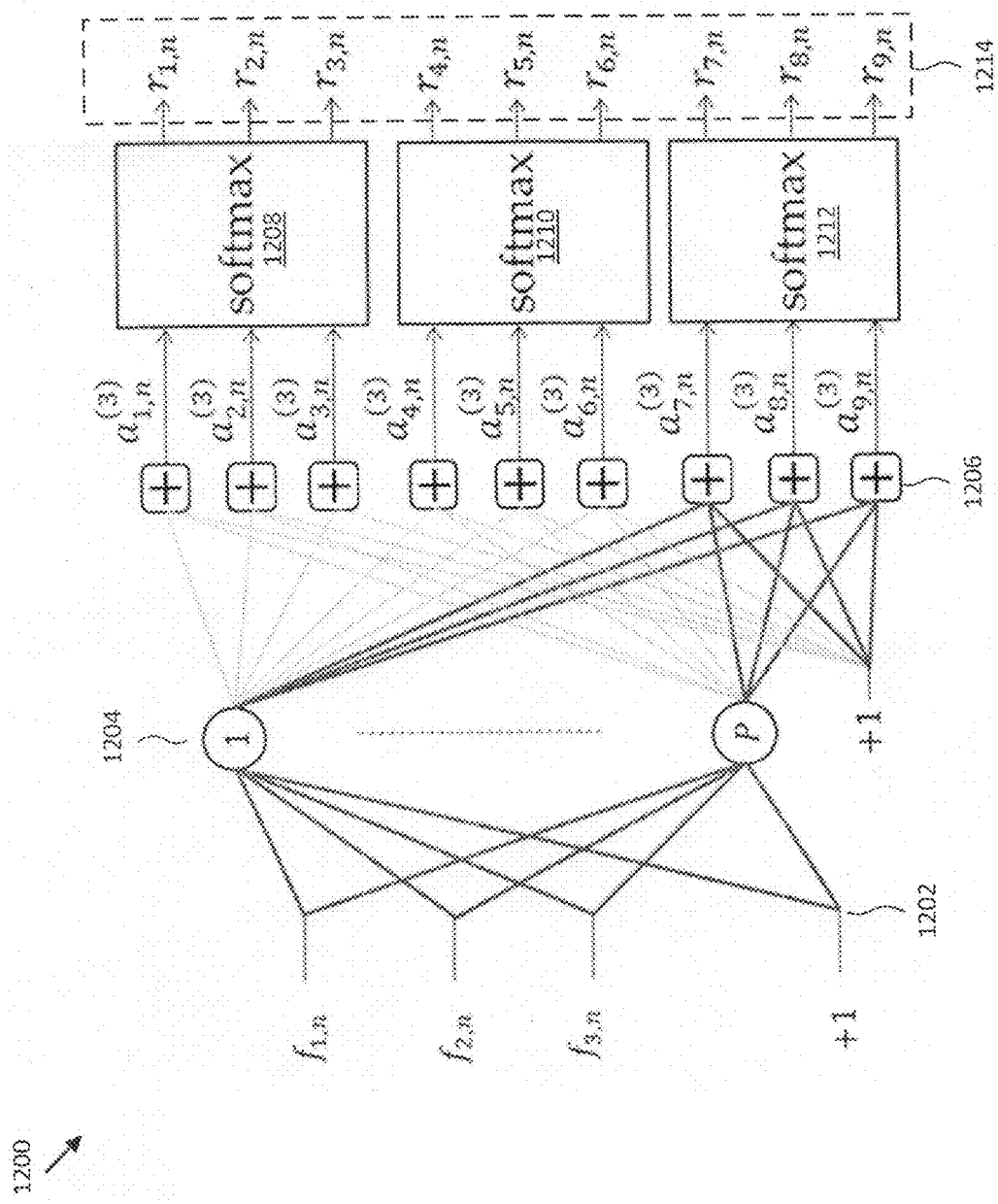
FIG. 12 illustrates another diagram of an MLP network, according to an embodiment.

FIG. 12 illustrates another diagram of an MLP network, according to an embodiment. An MLP network 1200 includes an input layer 1202, one hidden layer 1204, an output layer 1206, and three soft max functions 1208, 1210, and 1212 to produce the MLP outputs 1214. Training samples of 1024-QAM as shown in FIG. 12 are used to compute gradients with respect to weights $w_{7p}^{(2)}, w_{8p}^{(2)}, w_{9p}^{(2)}$, p=1, 2, ..., P and biases $\beta_7^{(2)}, \beta_8^{(2)}, \beta_9^{(2)}$. Only 1024-QAM samples are used to compute gradients with respect to weights and biases between the hidden layer 1204 and the output layer 1206 that are connected to $r_7, r_8, r_9$.

During the offline training, the MLP weights are updated using the gradient vector $\eta$. The MLP weight-vector is denoted by $\theta=[\theta_c^T, \theta_{64}^T, \theta_{256}^T, \theta_{1024}^T]^T$. The vector $\theta_c$ is the vector containing weights and biases between the input layer and the hidden layer. The vector $\theta_M$, $M \in \{64,256,1024\}$ is the vector containing weights and biases between the hidden layer and the output layer.

The vectors $\theta_c$ and $\theta_M$ are given by Equation (13) below $$\theta_c=[(\text{vec}\{W^{(1)}\})^T,(v^{(1)})^T]^T$$

$$\theta_M=[(\text{vec}\{W_M^{(2)}\})^T,(v_M^{(2)})^T]^T \qquad (13)$$

The vector $v^{(1)}$ in Equation (13) is the vector of biases at input of the hidden layer and $v_M^{(2)}$ is the vector of biases at the output layer. The vectors are given by Equation (14) below $$v^{(1)}=[v_1^{(1)},v_2^{(1)},\ldots,v_P^{(1)}]^T,$$

$$v_{64}^{(2)}=[v_1^{(2)},v_2^{(2)},v_3^{(2)}]^T,$$

$$v_{256}^{(2)}=[v_4^{(2)},v_5^{(2)},v_6^{(2)}]^T,$$

$$v_{1024}^{(2)}=[v_7^{(2)},v_8^{(2)},v_9^{(2)}]^T. \qquad (14)$$

Similarly, the matrix $W^{(1)}$ contains the weights of connections between the input layer and the hidden layer and the matrix $W_M^{(2)}$ contains the weights of the connections between the hidden layer and the output layer. The matrices are given by Equation (15) below:

$$W^{(1)} = \begin{bmatrix} w_{11}^{(1)} & \cdots & w_{13}^{(1)} \\ \vdots & \cdots & \vdots \\ w_{P1}^{(1)} & \cdots & w_{P3}^{(1)} \end{bmatrix}, W_{64}^{(2)} = \begin{bmatrix} w_{11}^{(2)} & \cdots & w_{1P}^{(2)} \\ \vdots & \cdots & \vdots \\ w_{31}^{(2)} & \cdots & w_{3P}^{(2)} \end{bmatrix} \qquad (15)$$

$$W_{256}^{(2)} = \begin{bmatrix} w_{41}^{(2)} & \cdots & w_{4P}^{(2)} \\ \vdots & \cdots & \vdots \\ w_{61}^{(2)} & \cdots & w_{6P}^{(2)} \end{bmatrix}, W_{1024}^{(2)} = \begin{bmatrix} w_{71}^{(2)} & \cdots & w_{7P}^{(2)} \\ \vdots & \cdots & \vdots \\ w_{91}^{(2)} & \cdots & w_{9P}^{(2)} \end{bmatrix}$$

The gradient of the cost function with respect to weights $w_{ij}^{(1)}$ and biases $v_i^{(1)}$ in between the input and the hidden layer are computed using a regular back-propagation method using all the training samples in the combined dataset. The gradient is denoted by $\eta_c$.

The gradients with respect to weights $w_{ij}^{(2)}$ and biases $v_i^{(2)}$ in between the hidden layer and the output layer are computed using a selective back-propagation method using training samples of specific M-QAM modulation in the training set. The gradient is denoted by $\eta_M$ where $M \in \{64, 256, 1024\}$-QAM. Computation of a gradient using selective back propagation may be performed as follows. The gradient vector is described as in Equation (16).

$$\eta=\nabla_\theta c=[\eta_c^T, \eta_{64}^T, \eta_{256}^T, \eta_{1024}^T]^T \qquad (16)$$

The gradient in Equation (16) is computed from partial derivative in Equation (17) below.

$$-\frac{\delta}{\delta a_{d,n}^{(3)}}\log(r_{z_n,n}) = r_{d,n} - 1, \text{ if } d = z_n, n \in N_M, d \in Z_M \qquad (17)$$

$$= r_{d,n}, \text{ if } d \neq z_n, n \in N_M, d \in Z_M$$

$$= 0, \text{ otherwise, where } N_M \text{ is the set of training}$$

samples of M-QAM and $Z_M$ is the set of indices indicating the candidate detectors for M-QAM.

The gradient is back-propagated using an error vector $e_{n,M}$ to compute the required partial derivatives. The 3×1 error vector is defined as in Equation (18).

$$e_{n,M}=r_{n,M}-\delta_{n,M}, n \in N_M \qquad (18)$$

where $r_{n,64}=[r_{1,n}, r_{2,n}, r_{3,n}]^T$, $r_{n,256}=[r_{4,n}, r_{5,n}, r_{6,n}]^T$, $r_{n,1024}=[r_{7,n}, r_{8,n}, r_{9,n}]^T$, and $\delta_{n,M}$ is a 3×1 binary vector with 1 at location d mod 3. d mod 3 is the remainder when d is divided by 3.

Using the error vector $e_{n,m}$, the gradients are computed as in Equation (19).

$$\eta_M = \sum_{n \in N_M} vec\{[e_{n,M}(a_{n,M}^{(3)})^T, e_{nM}]\}, \qquad (19)$$

$$x_{nM} = ((W_M^{(2)})^T e_{n,M}) \odot g'(a_n^{(2)})$$

$$\eta_c = \sum_{M \in \{64,256,1024\}} \sum_{n \in N_M} vec\{[x_{n,M}f_n^T, x_{n,M}]\}$$

where $\alpha_{n,64}^{(3)}=[\alpha_{1,n}^{(3)}, \alpha_{2,n}^{(3)}, \alpha_{3,n}^{(3)}]^T$, $\alpha_{n,256}^{(3)}=[\alpha_{5,n}^{(3)}, \alpha_{6,n}^{(3)}, \alpha_{7,n}^{(3)}]^T$, $\alpha_{n,1024}^{(3)}=[\alpha_{7,n}^{(3)}, \alpha_{8,n}^{(3)}, \alpha_{9,n}^{(3)}]^T$, g'(x) is the derivative of the activation function g (x), $f_n=[f_{1,n}, f_{2,n}, f_{3,n}]^T$ is the input feature vector, and vec{A} is vectorization of matrix A by its stacking columns. The vector $\alpha_n^{(2)}$ is the output of the hidden layer given by Equation (20)

$$\alpha_n^{(2)} = g(W^{(1)} f_n + v^{(1)}). \quad (20)$$

The vectors $\alpha_{n,M}^{(3)}$ denote the input to softmax blocks and the vectors are computed by Equation (21)

$$\alpha_{n,M}^{(3)} = W_M^{(2)} \alpha_n^{(2)} + v_M^{(2)}, M = 64, 256, 1024 \quad (21)$$

Figure 13:
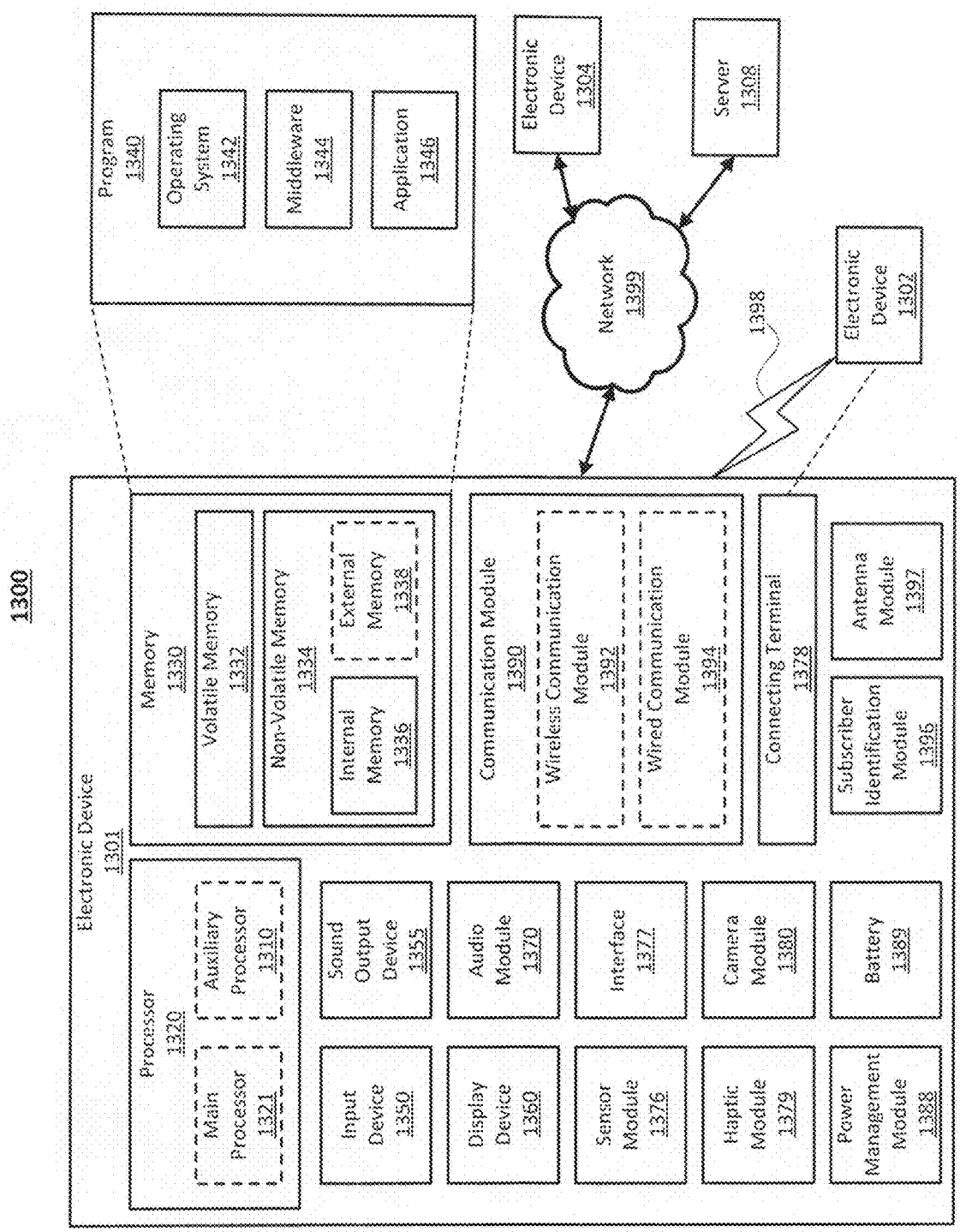
FIG. 13 is a block diagram of an electronic device in a network environment, according to one embodiment.

FIG. 13 is a block diagram of an electronic device 1301 in a network environment 1300, according to one embodiment. Referring to FIG. 13, the electronic device 1301 in the network environment 1300 may communicate with an electronic device 1302 via a first network 1398 (e.g., a short-range wireless communication network), or an electronic device 1304 or a server 1308 via a second network 1399 (e.g., a long-range wireless communication network). The electronic device 1301 may communicate with the electronic device 1304 via the server 1308. The electronic device 1301 may include a processor 1320, a memory 1330, an input device 1350, a sound output device 1355, a display device 1360, an audio module 1370, a sensor module 1376, an interface 1377, a haptic module 1379, a camera module 1380, a power management module 1388, a battery 1389, a communication module 1390, a subscriber identification module (SIM) 1396, or an antenna module 1397. In one embodiment, at least one (e.g., the display device 1360 or the camera module 1380) of the components may be omitted from the electronic device 1301, or one or more other components may be added to the electronic device 1301. In one embodiment, some of the components may be implemented as a single integrated circuit (IC). For example, the sensor module 1376 (e.g., a fingerprint sensor, an iris sensor, or an illuminance sensor) may be embedded in the display device 1360 (e.g., a display).

The processor 1320 may execute, for example, software (e.g., a program 1340) to control at least one other component (e.g., a hardware or a software component) of the electronic device 1301 coupled with the processor 1320, and may perform various data processing or computations. As at least part of the data processing or computations, the processor 1320 may load a command or data received from another component (e.g., the sensor module 1376 or the communication module 1390) in volatile memory 1332, process the command or the data stored in the volatile memory 1332, and store resulting data in non-volatile memory 1334. The processor 1320 may include a main processor 1321 (e.g., a central processing unit (CPU) or an application processor (AP)), and an auxiliary processor 1323 (e.g., a graphics processing unit (GPU), an image signal processor (ISP), a sensor hub processor, or a communication processor (CP)) that is operable independently from, or in conjunction with, the main processor 1321. Additionally or alternatively, the auxiliary processor 1323 may be adapted to consume less power than the main processor 1321, or execute a particular function. The auxiliary processor 1323 may be implemented as being separate from, or a part of, the main processor 1321.

The auxiliary processor 1323 may control at least some of the functions or states related to at least one component (e.g., the display device 1360, the sensor module 1376, or the communication module 1390) among the components of the electronic device 1301, instead of the main processor 1321 while the main processor 1321 is in an inactive (e.g., sleep) state, or together with the main processor 1321 while the main processor 1321 is in an active state (e.g., executing an application). According to one embodiment, the auxiliary processor 1323 (e.g., an image signal processor or a communication processor) may be implemented as part of another component (e.g., the camera module 1380 or the communication module 1390) functionally related to the auxiliary processor 1323.

The memory 1330 may store various data used by at least one component (e.g., the processor 1320 or the sensor module 1376) of the electronic device 1301. The various data may include, for example, software (e.g., the program 1340) and input data or output data for a command related thereto. The memory 1330 may include the volatile memory 1332 or the non-volatile memory 1334.

The program 1340 may be stored in the memory 1330 as software, and may include, for example, an operating system (OS) 1342, middleware 1344, or an application 1346.

The input device 1350 may receive a command or data to be used by other component (e.g., the processor 1320) of the electronic device 1301, from the outside (e.g., a user) of the electronic device 1301. The input device 1350 may include, for example, a microphone, a mouse, or a keyboard.

The sound output device 1355 may output sound signals to the outside of the electronic device 1301. The sound output device 1355 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 1360 may visually provide information to the outside (e.g., a user) of the electronic device 1301. The display device 1360 may include, for example, a display, a hologram device, or a projector and control circuitry to control a corresponding one of the display, hologram device, and projector. According to one embodiment, the display device 1360 may include touch circuitry adapted to detect a touch, or sensor circuitry (e.g., a pressure sensor) adapted to measure the intensity of force incurred by the touch.

The audio module 1370 may convert a sound into an electrical signal and vice versa. According to one embodiment, the audio module 1370 may obtain the sound via the input device 1350, or output the sound via the sound output device 1355 or a headphone of an external electronic device 1302 directly (e.g., wired) or wirelessly coupled with the electronic device 1301.

The sensor module 1376 may detect an operational state (e.g., power or temperature) of the electronic device 1301 or an environmental state (e.g., a state of a user) external to the electronic device 1301, and then generate an electrical signal or data value corresponding to the detected state. The sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device 1302 directly (e.g., wired) or wirelessly. According to one embodiment, the interface 1377 may include, for example, a high definition multimedia interface (HDMI), a universal serial bus (USB) interface, a secure digital (SD) card interface, or an audio interface.

A connecting terminal 1378 may include a connector via which the electronic device 1301 may be physically connected with the external electronic device 1302. According to one embodiment, the connecting terminal 1378 may include, for example, an HDMI connector, a USB connector, an SD card connector, or an audio connector (e.g., a headphone connector).

The haptic module 1379 may convert an electrical signal into a mechanical stimulus (e.g., a vibration or a movement) or an electrical stimulus which may be recognized by a user via tactile sensation or kinesthetic sensation. According to one embodiment, the haptic module 1379 may include, for example, a motor, a piezoelectric element, or an electrical stimulator.

The camera module 1380 may capture a still image or moving images. According to one embodiment, the camera module 1380 may include one or more lenses, image sensors, image signal processors, or flashes.

The power management module 1388 may manage power supplied to the electronic device 1301. The power management module 1388 may be implemented as at least part of, for example, a power management integrated circuit (PMIC).

The battery 1389 may supply power to at least one component of the electronic device 1301. According to one embodiment, the battery 1389 may include, for example, a primary cell which is not rechargeable, a secondary cell which is rechargeable, or a fuel cell.

The communication module 1390 may support establishing a direct (e.g., wired) communication channel or a wireless communication channel between the electronic device 1301 and the external electronic device (e.g., the electronic device 1302, the electronic device 1304, or the server 1308) and performing communication via the established communication channel. The communication module 1390 may include one or more communication processors that are operable independently from the processor 1320 (e.g., the AP) and supports a direct (e.g., wired) communication or a wireless communication. According to one embodiment, the communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module or a power line communication (PLC) module). A corresponding one of these communication modules may communicate with the external electronic device via the first network 1398 (e.g., a short-range communication network, such as Bluetooth™, wireless-fidelity (Wi-Fi) direct, or a standard of the Infrared Data Association (IrDA)) or the second network 1399 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1392 may identify and authenticate the electronic device 1301 in a communication network, such as the first network 1398 or the second network 1399, using subscriber information (e.g., international mobile subscriber identity (IMSI)) stored in the subscriber identification module 1396.

The antenna module 1397 may transmit or receive a signal or power to or from the outside (e.g., the external electronic device) of the electronic device 1301. According to one embodiment, the antenna module 1397 may include one or more antennas, and, therefrom, at least one antenna appropriate for a communication scheme used in the communication network, such as the first network 1398 or the second network 1399, may be selected, for example, by the communication module 1390 (e.g., the wireless communication module 1392). The signal or the power may then be transmitted or received between the communication module 1390 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 1301 and the external electronic device 1304 via the server 1308 coupled with the second network 1399. Each of the electronic devices 1302 and 1304 may be a device of a same type as, or a different type, from the electronic device 1301. All or some of operations to be executed at the electronic device 1301 may be executed at one or more of the external electronic devices 1302, 1304, or 1308. For example, if the electronic device 1301 should perform a function or a service automatically, or in response to a request from a user or another device, the electronic device 1301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1301. The electronic device 1301 may provide the outcome, with or without further processing of the outcome, as at least part of a reply to the request. To that end, a cloud computing, distributed computing, or client-server computing technology may be used, for example.

One embodiment may be implemented as software (e.g., the program 1340) including one or more instructions that are stored in a storage medium (e.g., internal memory 1336 or external memory 1338) that is readable by a machine (e.g., the electronic device 1301). For example, a processor of the electronic device 1301 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added. Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method for training a neural network, comprising:
generating a first labelled dataset corresponding to a first modulation scheme and a second labelled dataset corresponding to a second modulation scheme;
determining a first gradient of a cost function between a first neural network layer and a second neural network layer based on back-propagation using the first labelled dataset and the second labelled dataset; and
determining a second gradient of the cost function between the second neural network layer and a first set of nodes of a third neural network layer based on back-propagation using the first labelled dataset,
wherein the first set of nodes of the third neural network layer correspond to a first plurality of detector classes associated with the first modulation scheme.

2. The method of claim 1, further comprising:
updating a first plurality of weights and a first plurality of biases between the first layer and the second layer based on the first gradient.

3. The method of claim 1, further comprising:
updating a second plurality of weights and a second plurality of biases between the second layer and the first set of nodes of the third layer based on the second gradient.

4. The method of claim 1, further comprising:
determining a third gradient of the cost function between the second neural network layer and a second set of nodes of the third neural network layer based on back-propagation using the second labelled dataset.

5. The method of claim 4, further comprising:
updating a third plurality of weights and a third plurality of biases between the second neural network layer and the second set of nodes of the third neural network layer based on the third gradient.

6. The method of claim 1, further comprising selecting a detector class of the first plurality of detector classes based on outputs of the neural network.

7. The method of claim 1, wherein the first labelled dataset and the second labelled dataset are generated based on a log-likelihood ratio (LLR) sign.

8. The method of claim 7, wherein the first labelled dataset and the second labelled dataset are further generated based on an LLR magnitude.

9. The method of claim 1, wherein the first gradient of the cost function is determined based on an error vector used to compute partial derivatives.

10. Method of claim 1, wherein the second gradient of the cost function is determined based on an error vector used to compute partial derivatives.

11. A system for training a neural network, comprising:
a memory; and
a processor configured to:
generate a first labelled dataset corresponding to a first modulation scheme and a second labelled dataset corresponding to a second modulation scheme;
determine a first gradient of a cost function between a first neural network layer and a second neural network layer based on back-propagation using the first labelled dataset and the second labelled dataset; and
determine a second gradient of the cost function between the second neural network layer and a first set of nodes of a third neural network layer based on back-propagation using the first labelled dataset,
wherein the first set of nodes of the third neural network layer correspond to a first plurality of detector classes associated with the first modulation scheme.

12. The system of claim 11, wherein the processor is further configured to update a first plurality of weights and a first plurality of biases between the first layer and the second layer based on the first gradient.

13. The system of claim 11, wherein the processor is further configured to update a second plurality of weights and a second plurality of biases between the second layer and the first set of nodes of the third layer based on the second gradient.

14. The system of claim 11, wherein the processor is further configured to determine a third gradient of the cost function between the second neural network layer and a second set of nodes of the third neural network layer based on back-propagation using the second labelled dataset.

15. The system of claim 14, wherein the processor is further configured to update a third plurality of weights and a third plurality of biases between the second neural network layer and the second set of nodes of the third neural network layer based on the third gradient.

16. The system of claim 11, wherein the processor is further configured to select a detector class of the first plurality of detector classes based on outputs of the neural network.

17. The system of claim 11, wherein the first labelled dataset and the second labelled dataset are generated based on a log-likelihood ratio (LLR) sign.

18. The system of claim 17, wherein the first labelled dataset and the second labelled dataset are further generated based on an LLR magnitude.

19. The system of claim 11, wherein the first gradient of the cost function is determined based on an error vector used to compute partial derivatives.

20. The system of claim 11, wherein the second gradient of the cost function is determined based on an error vector used to compute partial derivatives.

* * * * *